DESIGN.
J. W. FLEISCHMANN.
BACK COMB.
No. 7,145. Reissued May 30, 1876.
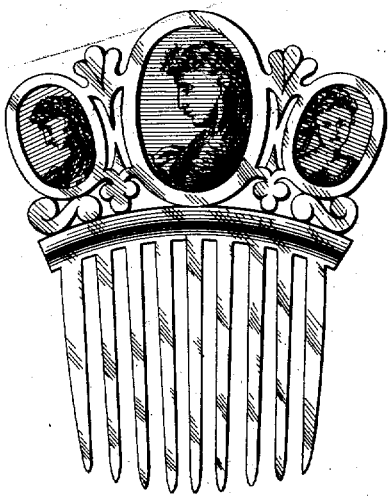
Witnesses:
Mary L. Adams.
Geo. H. Miatt
Inventor:
Julius W. Fleischmann
Per Edw. E. Quimby
Atty

UNITED STATES PATENT OFFICE.

JULIUS W. FLEISCHMANN, OF WILLIAMSBURG, NEW YORK.

DESIGN FOR A BACK COMB.

Specification forming part of Design No. 8,997, dated February 15, 1876; reissue No. 7,145, dated May 30, 1876; application filed May 8, 1876.

*To all whom it may concern:*

Be it known that I, JULIUS W. FLEISCHMANN, of Williamsburg, Kings county, New York, have originated a Design for the Head-Pieces of Combs, of which the following is a full, clear, and exact description, reference being had to the accompanying drawing, making part of this specification.

My design relates to the head-pieces or tops of combs, and in the accompanying drawing it is illustrated as applied to a back comb.

My design consists of a head-piece of a comb, having formed in it one or more frames or cases, containing a picture or pictures on glass, porcelain, or other suitable material, as hereinafter set forth.

In the annexed drawing, A represents an ordinary back comb made of tortoise-shell or other suitable material. The top or head-piece of this comb is formed into one or more frames, B, in which are fastened pictures C, made upon glass, porcelain, or any other suitable material.

The mechanical construction, which is herein indicated, I have made the subject of an application for a mechanical patent.

What I claim as my invention is—

A design for the head-piece of a comb, the essential characteristic of which is that the head-piece has formed in it one or more picture frames or cases, containing a picture or pictures, substantially as shown.

JULIUS W. FLEISCHMANN.

Witnesses:

EDWD. PAYSON,

GEO. W. MIATT.